(12) United States Patent
Suggs et al.

(10) Patent No.: US 6,241,256 B1
(45) Date of Patent: Jun. 5, 2001

(54) GASKET FOR HEAT EXCHANGER AND METHOD AND APPARATUS FOR MANUFACTURING SAME

(75) Inventors: Steven M. Suggs; Reid M. Meyer, both of Nacogdoches, TX (US)

(73) Assignee: Acadia Elastomers Corporation, Nacogdoches, TX (US)

( * ) Notice: Subject to any disclaimer, the term of this patent is extended or adjusted under 35 U.S.C. 154(b) by 0 days.

(21) Appl. No.: 09/122,038

(22) Filed: Jul. 23, 1998

(51) Int. Cl.$^7$ ..................................................... F16J 15/02
(52) U.S. Cl. ......................... 277/630; 277/631; 277/652; 277/938; 72/307; 29/460; 29/888.3; 228/173.5
(58) Field of Search ..................................... 277/610, 608, 277/630, 631, 633, 652, 938; 72/307; 29/460, 469.5, 888.3; 228/173.1, 173.5

(56) References Cited

U.S. PATENT DOCUMENTS

| | | | |
|---|---|---|---|
| 505,084 | * 9/1893 | Barnes | 277/631 |
| 505,703 | * 9/1893 | Dodge | 277/631 |
| 747,448 | * 12/1903 | Lomasney | 277/631 |
| 749,969 | * 1/1904 | Munson | 277/631 |
| 866,696 | * 9/1907 | Taylor | 277/631 |
| 3,404,061 | 10/1968 | Shane et al. | 161/125 |
| 4,017,090 | * 4/1977 | Cohen | 277/644 |
| 4,464,923 | * 8/1984 | Boggs et al. | 72/307 |
| 5,499,827 | 3/1996 | Suggs et al. . | |
| 5,765,427 | * 6/1998 | Codatto | 72/307 |
| 5,765,838 | * 6/1998 | Ueda et al. | 277/650 |
| 5,771,725 | * 6/1998 | Mizukawa | 72/17.3 |
| 5,946,786 | * 9/1999 | Ishii et al. | 29/283.5 |
| 5,946,960 | * 9/1999 | Lanticina | 72/149 |

OTHER PUBLICATIONS

Grafoil Engineering Design Manual; Union Carbide Corp., 1987; vol. I; "Sheet and Laminate Products", pp. 3, 4, 7, 9, 10, 14.
Calgraph Technical Manual; PolyCarbon, Inc.; Jul. 1, 1993; pp. 3.1, 3.2, 4.1, 4.2, 25.1, 25.3, 25.4.
Flexitallic Catalog 278, Single and Double–Jacketed Gaskets/Metallic and Non–Metallic Gaskets, Flexitallic Gasket Company, Inc., Deer Park, Texas, pp. 1–8, undated.
Flexitallic, Special Heat Exchanger Gaskets, Flextallic Gasket Company, Inc., Deer Park, Texas, pp. 38–39, undated.
Metallic Jacketed Gaskets, Technical Data Sheets, Leader Gasket, Inc., Houston, Texas, pp. 3–1, 3–2, 3–3, 3–4, 4–1, and 4–2, undated.
Tighten Up With M&P Graphonic™ Gaskets—An Innovative Aolution For Controlling Fugitive Emissions, Marine and Petroleum Mfg., Inc., Houston, Texas, undated.

* cited by examiner

Primary Examiner—Anthony Knight
Assistant Examiner—Alison K. Pickard
(74) Attorney, Agent, or Firm—Baker, Donelson, Bearman & Caldwell

(57) ABSTRACT

An apparatus for manufacturing a large-diameter gasket in which a pair of holding presses have press members which selectively bears against an elongate band while a bending press pivots against a portion of the band. The drive press bears against a portion of the band, and with the holding presses released, moves longitudinally to move a next portion of the band into the bending press. A method of manufacturing the large-diameter gasket is disclosed, together with a jig for applying a patch of sealing material to a joint formed between opposing distal ends of the gasket.

8 Claims, 3 Drawing Sheets

GASKET FOR HEAT EXCHANGER AND METHOD AND APPARATUS FOR MANUFACTURING SAME

TECHNICAL FIELD

The present invention relates to large-diameter gaskets. More particularly, the present invention relates to large-diameter gaskets for heat exchangers and to apparatus and methods for the manufacture of large-diameter gaskets.

BACKGROUND OF THE INVENTION

Heat exchanger are large pieces of mechanical air and fluid handling equipment having large cross-sectional dimensions. Adjacent components of heat exchanger connect together at flanges with bolts. Gaskets seal the connection of the adjacent components to prevent leakage from the heat exchanger.

Periodically, or as necessary, the gaskets that seal the connections in heat exchanger are replaced. It has been the practice in the industry for the new gaskets to be custom manufactured, typically by a gasket distribution company local to the facility requiring the new gaskets. There are several reasons for this practice. Generally, no major company manufacturing small-diameter gaskets provides large-diameter gaskets for heat exchanger. Small diameter gaskets are generally available in a wide range of inner and outer diameters, generally having overall diameters of up to about twelve inches. For large-diameter applications, generally of twelve inches and greater, there are a number of different gasket patterns, and replacement typically is an infrequent occurrence. It is impractical to inventory replacement gaskets for large diameter applications.

In contrast, the smaller gaskets for fluid flow control devices are used more frequently, and manufacturers of gaskets maintain dies in a wide range of inner and outer diameters to manufacture small-diameter gaskets up to approximately twelve inches. Such smaller gaskets are easier to store in warehouses and ship to distributors or end-users for installation. The large-diameter gaskets however are more difficult to handle and store due to their size, the flexibility of the gasket, and the brittle nature of the sealing material of the gasket.

Presently, replacement large-diameter gaskets are generally made by gasket distributors which are local to the site requiring replacement gaskets. The replacement gaskets are made with a metal ring overlaid with sealing materials. The ring is cut using a gasket template laid over a large plate of sheet metal. The sealing material is typically cut from a sheet of calendared graphite having a layer of adhesive. Such product is available commercially in a number of thicknesses and densities. The sheet is laid on a table and the ring is placed on the adhesive layer. The gasket is then cut from the sheet. The ring is turned over and placed on a second sheet to coat the opposing side of the ring. The remaining materials are generally scrapped as waste, which comprises an additional cost. The gasket is then moved carefully to the heat exchanger and installed.

While these locally-manufactured gaskets have provided replacement gaskets for large-diameter sealing applications, there are drawbacks to their usage. These drawbacks include the inability to incorporate into the large diameter gaskets the improvements found in modern small diameter gaskets. The uniformity of the custom-made gasket varies one to another, and the overall quality depends upon the experience of the technician manufacturing the gasket.

Accordingly, there is a need in the art for an improved heat exchanger gasket, together with an apparatus and method of manufacturing improved heat exchanger gaskets. It is to such that the present invention is directed.

SUMMARY OF THE INVENTION

The present invention meets the needs in the art by providing an apparatus and method for manufacturing a large diameter heat exchanger gasket. The apparatus comprises a holding press and a bending press which are disposed coaxially and spaced-apart for receiving an elongate band therethrough. Each press is selectively positionable in a first position for allowing the elongate gasket band to move longitudinally through the holding press and the bending press and a second position holding the band rigidly from movement relative to the respective press. A drive press is disposed coaxially with and spaced-apart from the holding press and operative in opposite mode to the holding press and the bending press, whereby the elongate gasket band is held tightly when the holding press and the bending press is in the first position. The drive press is also movable longitudinally from a first position to a second position for moving a portion of the elongate gasket band through the bending press. The bending press is pivotable from a first position to a second position at an oblique angle relative to a longitudinal axis of the elongate band for bending the band at an oblique angle relative to the longitudinal axis. Pneumatic cylinders move the respective presses. The holding press and the bending press operate in unison to move to the second position to hold the elongate band during a bending step when the bending press pivots from the first position to the second position. The drive press operates in a holding mode for gripping the elongate gasket band while the holding press and the bending press are in the first position in order for the drive press to move a portion of the elongate band longitudinally through the bending press.

The apparatus of the present invention provides a preferred embodiment of a large diameter gasket, comprising an elongate, narrow band having distal ends joined together to define a closed loop with a diameter exceeding twelve inches. A jacket of a sealing material enwrapps substantially the entire band. A patch of the sealing material enwrapps a portion of the loop where the distal ends join together.

The present invention provides a method of manufacturing a large diameter gasket, in which an elongate band moves a predetermined distance to advance a portion of the elongate band into a bending press. An adjacent holding press and the bending press hold the elongate band firmly. The bending press pivots adjacent the holding press from a first position to a second position to bend the portion of the band at an oblique angle laterally. The elongate band is released from being secured in the holding press and the bending press. The steps are repeated until a loop of a predetermined diameter is formed. The loop is separated from the band, and opposing distal ends joined together to form a large-diameter gasket.

Objects, advantages and features of the present invention will become apparent from a reading of the following detailed description of the invention and claims in view of the appended drawings.

DETAILED DESCRIPTION OF THE PREFERRED EMBODIMENTS

Figure 1:
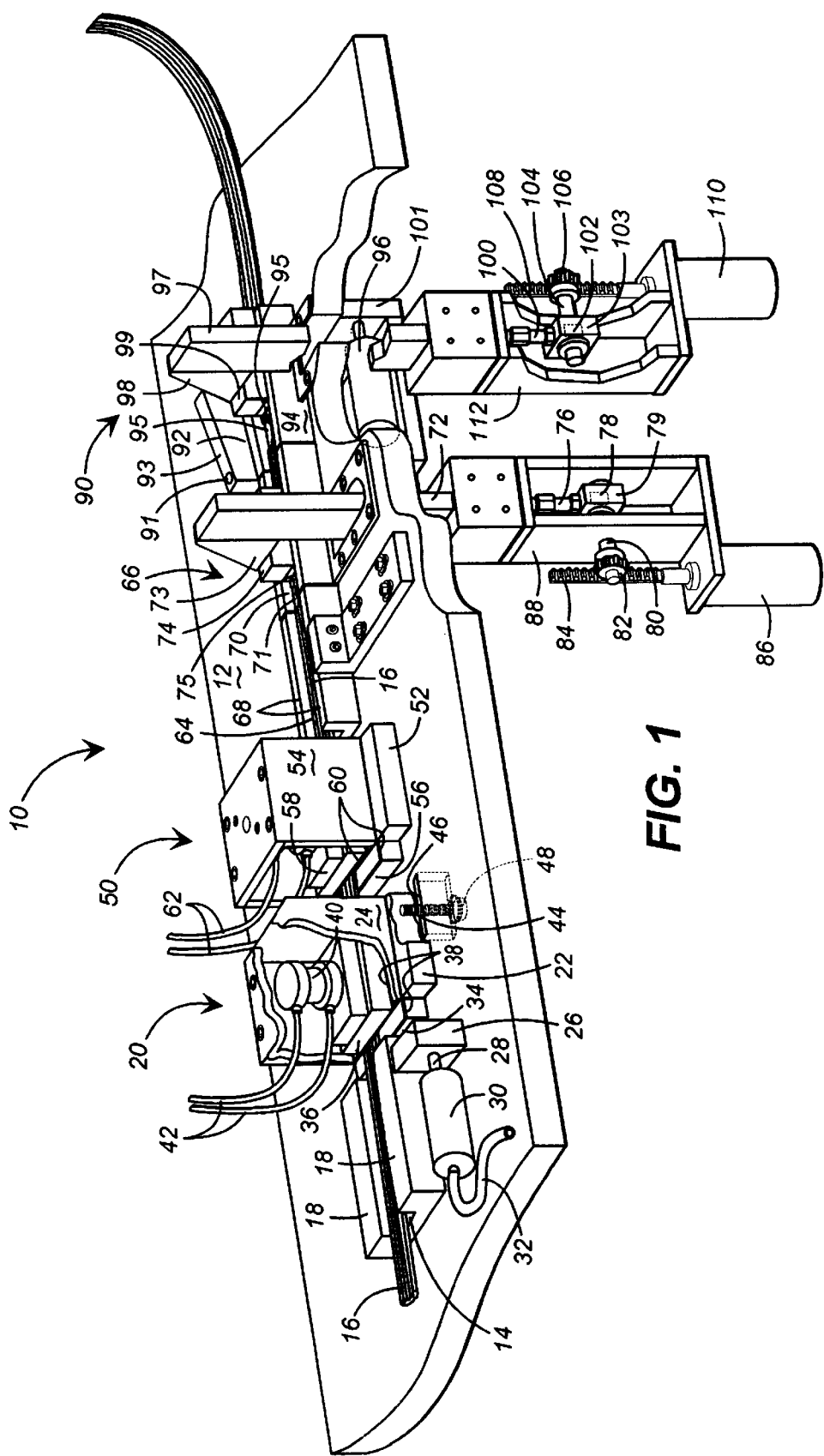
FIG. 1 is a perspective view of an apparatus for manufacturing a large-diameter gasket of the present invention.

Referring now in more detail to the drawings in which like parts have like identifiers, FIG. 1 illustrates in perspective view an apparatus 10 according to the present invention for manufacturing a large-diameter gasket particularly useful for heat exchanger applications. The apparatus 10 includes a table 12 to support the components of the apparatus. A feed channel 14 defines a U-shaped body which aligns an elongated narrow band 16 for being machined into a gasket of the present invention. The feed channel 14 is preferably made from a polymeric block and defines opposing sidewalls 18. The band 16 is received between the sidewalls 18 which align the band for passing through the apparatus 10.

A drive press 20 is coaxially disposed adjacent the feed channel 14. The drive press 20 includes a base 22 for a press housing 24. A connector block 26 at a first side of the base 22 connects to a cylinder rod 28 extending from a pneumatic cylinder 30. The cylinder 30 communicates with supply of pressurized air through pneumatic hoses 32. A controller controls the operation of the cylinder 30 and the other pneumatic cylinders discussed below. The base 22 receives a channel member 34 and a press member 36. The channel member 34 and the press member 36 include urethane skins 38 on respective opposed facing surfaces. The press member 36 attaches to a pneumatic cylinder 40 mounted to the top of the press housing 24 and communicates through pneumatic hoses 42 to the supply of pressurized air. The press member 36 is movable from a first position retracted away from the channel member 34 to a second position bearing against the channel member.

The base 22 connects to a pair of bolts 44 on opposing sides. The bolts 44 extend from the base 22 through respective slots 46 defined in the table 12 and engage sliding members 48 below the table. The drive press 20 is moveable from a first position close to the end of the feed channel 14 to a second position spaced-apart from the feed channel, for a purpose discussed below.

A first holding press 50 is coaxially aligned and spaced-apart from the drive press 20. The first holding press 50 is similar to the drive press 20, but is rigidly connected to the table 12. A base 52 supports a press housing 54 which contains a channel member 56 and a press member 58. The channel member 56 and the press member 58 include urethane skins 60 in opposing surfaces. The press member 58 attaches to a pneumatic cylinder (not illustrated, but similar to the cylinder 30) mounted to the top of the press housing. The cylinder communicates through pneumatic hoses 62 to the supply of pressurized air under direction of the pneumatic cylinder controller. The press member 58 is movable from a first position retracted away from the channel member 56 to a second position bearing against the channel member 56.

An intermediate channel 64, U-shaped in configuration, is disposed between the first holding press 50 and a second holding press 66. The channel 64 has opposing side walls 68 that guide the opposing side edges of the elongate band 16 as it moves through this portion of the apparatus 10. The second holding press 66 includes a U-shaped channel 70 with a channel member 71 and an upright support 72 on one side. A flange 73 extends laterally from the upright support 72 over the channel member 71 and a press member 74 attaches to the flange 73. The channel member 71 and the press member 74 have urethane skins 75 on facing surfaces.

The upright support 72 connects to a rod 76 having a cam 78 at a distal end. A drive shaft 80 extends a cam block 79 and connects to the cam 78. The drive shaft 80 also connects to a pinion gear 82 that rotates on a rack 84. The rack 84 moves between a first and a second position in response to operation of a pneumatic cylinder 86 to which the rack connects. Rotation of the pinion gear 82 causes the shaft 80 to rotate and move the cam 78 against the cam block 79. The rod 76 thereby moves relative to the shaft 80. This movement causes the upright support 72 to move between a first position with the press member 74 retracted from the channel member 71 to a second position with the press member bearing against the channel member. A frame 88 for the cam 78, the drive shaft 80, the pinion 82, and the rack 84, fixedly connects to supports (not illustrated). The support 72 accordingly is moveable relative to the frame 88.

A bending press 90 pivotally connects by a pivot pin 91 adjacent the second holding press 66. The bending press 90 includes a channel 92 which receives the elongate band 16 on a channel member 93 (shown in cut-away view below the band 16). A side wall 94 bears on a side edge of the band 16. An opposing side wall extends away at an oblique angle. The bending press 90 pivots between a first position with the side wall 94 parallel to a longitudinal axis of the band 16 in the second holding press 66 and a second position with the side wall 94 at an oblique angle relative to the axis.

Similar to the second holding press 66, the bending press 90 includes an upright support 97 on one side of the channel 92. A flange 98 extends laterally from the upright support 97 over the channel 92 and a press member 99 attaches to the flange. The channel member 93 and the press member 98 include urethane skins 95 on facing surfaces. A pneumatic cylinder 96 attaches to the table 12 and a cylinder rod engages a plate 101 on the pivot press 90.

The upright support 97 connects to a rod 100 having a cam 102 at a distal end. The cam 102 engages a drive shaft 104 which extends through a cam block 103. The drive shaft 104 also connects to a pinion gear 106 that rotates on a rack 108. The rack 108 moves between a first position and a second position in response to operation of a pneumatic cylinder 110 to which the rack connects. This causes the shaft 104 to rotate the cam 102 against the cam block 103. This movement causes the upright support 97 to move between a first position with the press member 98 retracted from the channel member 93 to a second position with the press member bearing against the channel member. A frame 112 for the drive shaft 104, pinion 106, and rack 108 fixedly connects to supports (not illustrated). The support 97 accordingly is moveable relative to the frame 112.

Figure 2:
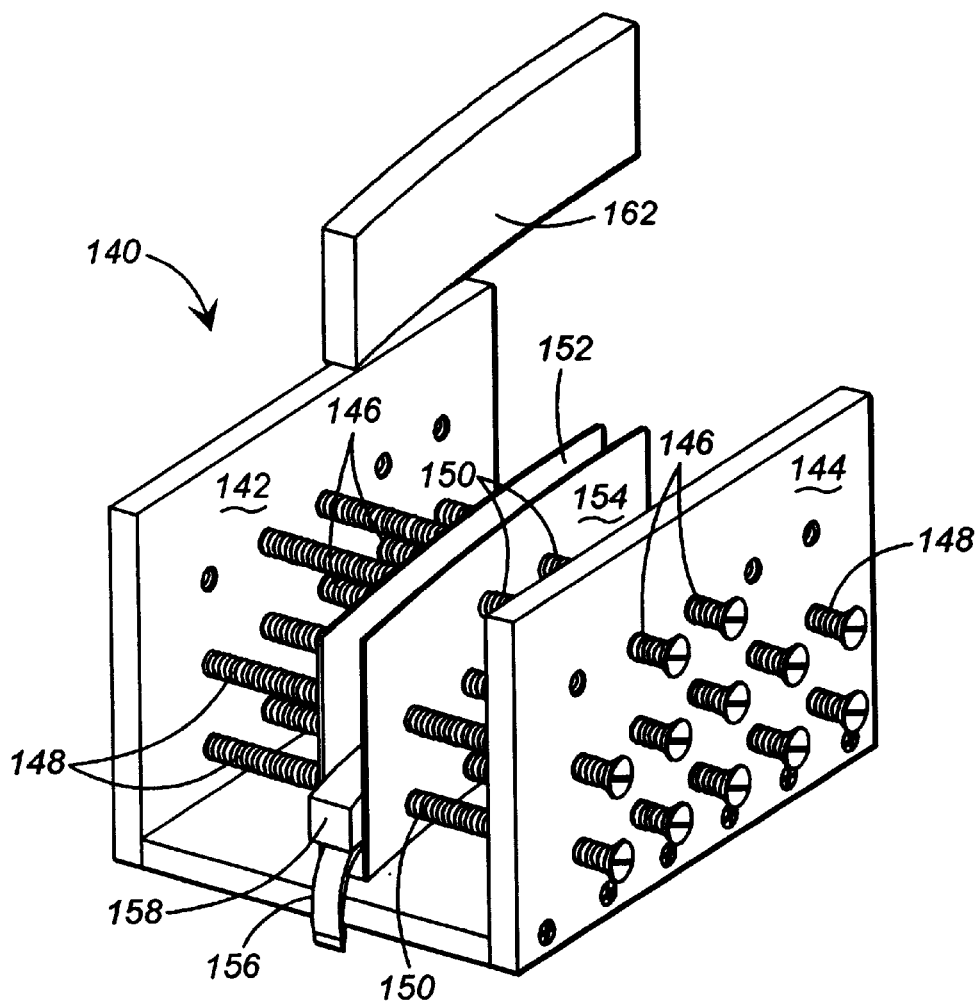
FIG. 2 is a perspective view of a jig for forming a patch of sealing material over the joint made by distal ends of a loop gasket made with the apparatus illustrated in FIG. 1.

FIG. 2 is a perspective view of a jig 140 for forming a patch of sealing material over a joint made by connecting opposing distal ends of a loop gasket together, which loop gasket is made with the apparatus 10 illustrated in FIG. 1, as discussed below. The jig 140 defines a U-shaped frame having opposing side walls 142, 144 which each define a plurality of opposing threaded bores 146. A plurality of bolts 148 are received separately in a respective one of the bores 146 with distal ends 150 inwardly of the sides. The bolts 148 are movable in the bores 146 to dispose the respective distal ends 150 of the bolts between a retracted position close to the respective side 142, 144 and an extended position spaced inwardly from the sides. A pair of spaced-apart plates 152, 154 are disposed between the distal ends 150 of the bolts 148. A pair of resilient pads 156, 158 are received between the plates 152, 154 for sandwiching a portion 160 of a loop formed with the apparatus 10, for coating the portion with gasket materials, as discussed below. A plunger 162 has an arcuate shape conforming to an arc of the gasket being manufactured. The plunger 162 connects to a rod extending from a hydraulic cylinder (not illustrated). Operation of the hydraulic cylinder causes the plunger 162 to move from a retracted position to a bearing position between the plates 152, 154 against the pad 158.

Figure 3:
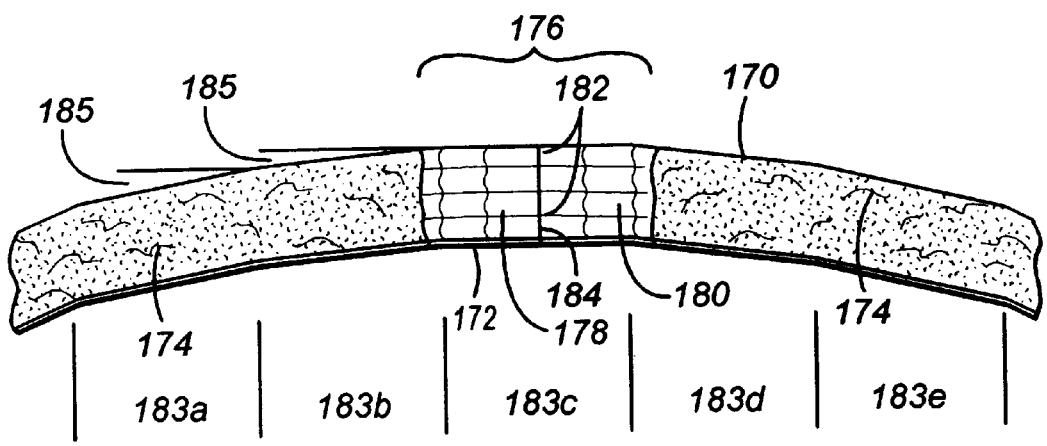
FIG. 3 is a plan view of the joined ends of the loop formed by the apparatus illustrated in FIG. 1.

FIG. 3 is a plan view of a portion of a gasket 170 made from a loop formed by the apparatus illustrated in FIG. 1. The gasket 170 comprises a separated portion of the narrow band 16 that is moved through the apparatus 10. The band 16 preferably is a narrow, thin ribbon 172 coated with a sealing material 174. In a preferred embodiment, the ribbon 172 is metal. The loop includes an exposed portion 176 from which the sealing material 174 is removed. The loop formed by the apparatus 10 has opposing distal ends 178, 180 which are rigidly joined, preferably with welds 182, at a joint 184. This joint 184 defines the endless ring gasket 170. The exposed portion 176 is then re-coated with sealing material using the jig 140, as discussed below. It is to be appreciated that the loop is formed by a series of chords, or portions 183 of the band 16 bent at an oblique angle 185 relative to the adjacent portion, as illustrated for several portions 183a, 183b, 183c, 183d, and 183e of the gasket 170.

Figure 4:
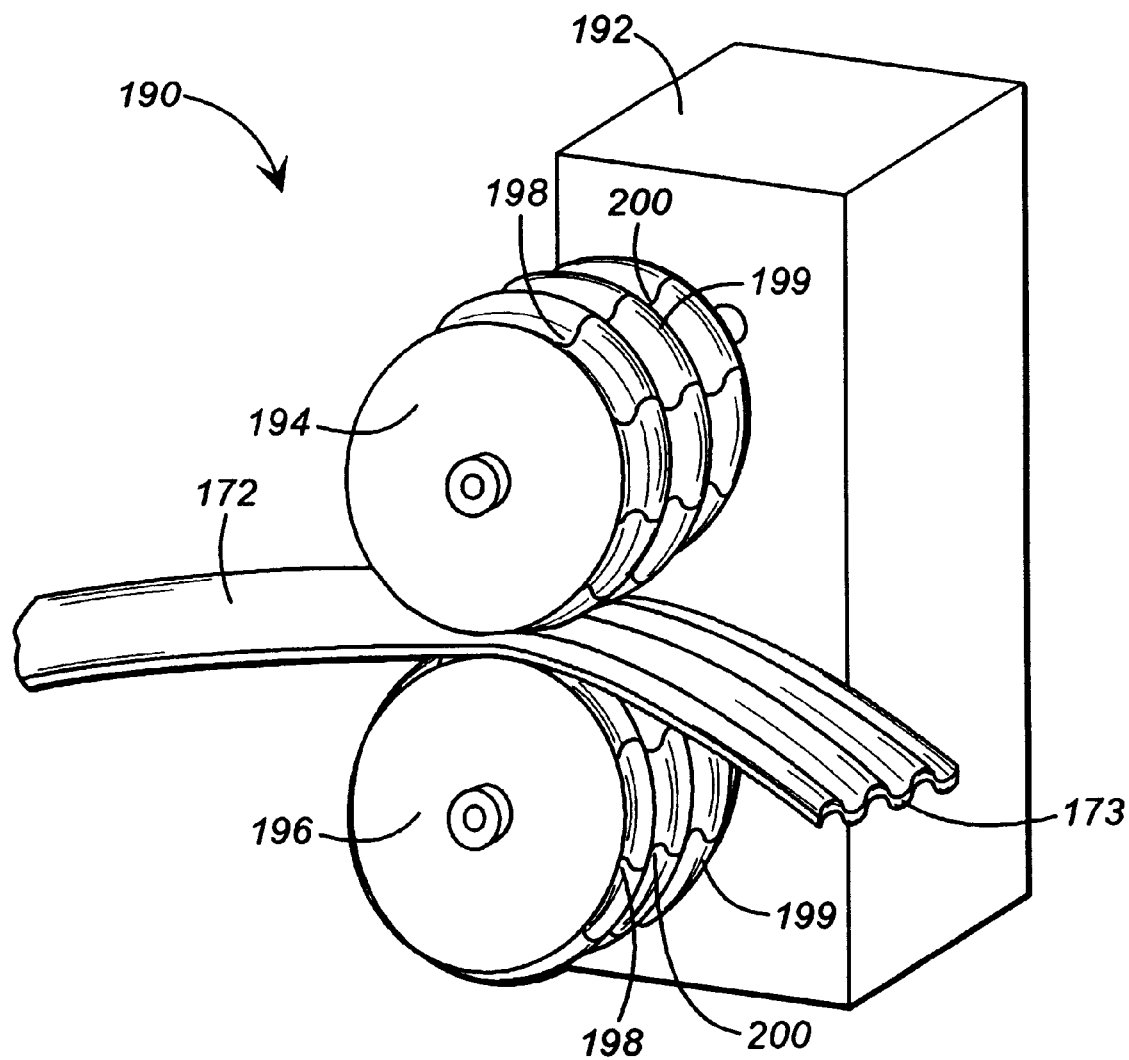
FIG. 4 is a perspective view of a roller apparatus for corrugating a narrow band used to form gaskets with the apparatus illustrated in FIG. 1.

FIG. 4 is a perspective view of a roller apparatus 190 for corrugating the ribbon 172 used to form gaskets with the apparatus 10. The roller apparatus 190 includes a frame 192 in which a pair of rollers 194, 196 are mounted on axles 197 for rotation. The rollers 194, 196 rotate by motors (not illustrated) connected to the axles 197. The arcuate faces 198 of the rollers 194, 196 define mating corrugated surfaces having ridges 199 and valleys 200. The ribbon 172 passes between the rollers 194, 196 which bear forcibly against the band to define longitudinally extending corrugations 173 in the band.

With reference to FIGS. 1–3, the apparatus 10 and the jig 140 are used to manufacture a gasket 170 according to the present invention. The gasket 170 preferably comprises a narrow, elongated metal ribbon 172 coated with gasket sealing material 174. In a preferred embodiment, the gasket sealing material is expanded intercalated graphite worms applied to and compressed against the body of the band 172. Expanded intercalated graphite worms result from expanding intercalated graphite flakes. Expandable intercalated flake graphite is formed by treating natural or synthetic flake graphite with an intercalating agent such as fuming nitric acid, fuming sulphuric acid, or mixtures of concentrated nitric and sulphuric acid. Expandable intercalated graphite flakes can then be expanded to form a low density, worm-like form of particulate graphite. The production of expandable intercalated flake graphite as an intermediate step in the production of expanded intercalated flake graphite is described in U.S. Pat. No. 3, 404,061. In a preferred embodiment of the present invention, the band 172 includes the plurality of longitudinally-extending corrugations 173. With reference to FIG. 4, the corrugations 173 are defined by moving the elongate band 172 between the pair of rollers 194, 196. U.S. Pat. No. 5,499,827, incorporated herein by reference, describes an apparatus and method for applying a coating of a sealing material to an elongate core. Such apparatus and method disclosed therein is gainfully used to coat the elongated band 172 with the sealing material 174 to form the elongated coated band 16.

With continued reference to FIGS. 1–3, the elongated coated band 16 is received in the feed channel 14. This is accomplished by moving the press members 36, 58, 74, and 99 to their respective first positions, whereby gaps are opened between the press members and the respective channel members 34, 56, 71, and 92, for receiving the band 16 through the drive press 20, the first and second holding presses 50 and 66, and the bending press 90. A distal end portion of the band 16 is positioned in the bending press 90. The length of the distal end portion is based on the diameter of the gasket to be formed.

The apparatus 10 is then positioned for operation. The pneumatic cylinders in the first and second holding presses 50 and 66 and in the bending plate 90 are operated to move the respective press members 58, 74, and 99 to their second positions bearing against the channel members 34, 56, and 93, respectively. This sandwiches the band 16 between the channel members and the press members. The urethane skins 38, 60, and 95 on the respective channel members and press members provide a smooth surface which does not mar or damage the sealing material 174 on the band 16.

The pneumatic cylinder 96 operates to pivot the bending press 90 on the pivot pin 91 to the second position at an oblique angle 185 to the longitudinal axis of the band 16 in the second holding press 66. The side 94 of the channel 92 bears against the side edge of the band 16. The bending press 90 thereby forces the band 16 to bend at a line defined by the adjacent second holding press 66 and the bending press 90. The press member 74 and 99 hold the band 16 firmly from slipping as the bending press 90 pivots. While the holding press 50 secures a distal end of the band 16, the holding press may not be necessary for successful use of the present invention. The angle 185 of bend is controllable by the extension of the cylinder rod from the cylinder 96. The angle of the bend is based on the diameter of the gasket being formed by the apparatus 10.

The pneumatic cylinder 96 is again operated to pivot the bending press back to its first position. The distal end portion of the band 16 has a bend formed therein as illustrated in FIG. 3, which bend extends at an oblique angle 185 relative to the adjacent portion 183.

The pneumatic cylinders in the first holding press 50, the second holding press 66, and the bending press 90 are then operated to move the respective press members 58, 74, and 99 to the first positions. The pneumatic cylinder 30 is then operated to push the drive press 20 from its first position to the second position. As the drive press 20 moves in guidance of the bolts 44 in the slots 46, the elongate coated band 16 is moved longitudinally relative to the holding presses 50 and 66 and the bending press 90. The drive press 20 moves a predetermined distance to push a new portion of the band 16 into the bending press 90.

The pneumatic cylinders in the first holding press 50, the second holding press 66, and the bending press 90 are then operated to move the respective press members 58, 74, and 99 to their second positions. The band 16 is then fixed in position in the apparatus 10. The pneumatic cylinder 40 in the drive press is then operated to move the press member 36 to its first position. The band 16 is then free of engagement to the drive press 20. The pneumatic cylinder 30 is operated to retract the drive press 20 from the second position to the first position. The cylinder 40 is again operated to move the press member 36 to the second position bearing against the channel member 34 and the band 16. The bending press 90 is then operated as discussed above to place a bend in another portion 183 of the elongate coated band 16. This process is repeated in succession until a loop for a large diameter gasket is formed and a portion of the band 16 overlaps another portion. The bending step effectively places a chord in the band 16, and a sufficient number of chords substantially defines a large diameter gasket.

As shown in FIG. 3, the overlapped portion of the band 16 is cut to separate the loop from the band 16 and define opposing distal ends 178, 180. The sealing material 174 at the distal ends 178, 180 is removed for the exposed portion 176 of the gasket. The opposing distal ends 178, 180 are joined together to form a joint 184 and thereby close the gasket. Preferably, the ends are welded at weld points 182.

With reference to FIG. 2, the exposed portion 176 of the gasket 170 is then patched with sealing materials using the jig 140. In a preferred embodiment, the sealing material is a plurality of expanded intercalated graphite worms. The sealing material is placed on the lower resilient pad 156 between the plates 152, 154. The exposed portion 176 of the gasket 170 is positioned on sealing material between the plates 152, 154. Additional sealing material is placed over the exposed portion 176. The upper resilient pad 158 is placed between the plates on the sealing material. The bolts 148 are threaded in the bores 146 to move the distal ends 150 firmly against the plates 152, 154. The plunger 162 is moved by a hydraulic cylinder (not illustrated) from a first position away from the jig 140 to a second position in bearing contact with the sandwich of the pads 156, 158, the sealing material, and the exposed portion 176 of the gasket 170. The plunger 162 firmly compresses the sealing material around the exposed portion 176. The plunger 162 may be pushed and retracted several times to assure compressive bonding of the sealing material. The plunger 162 is then retracted to its first position. The bolts 148 are disengaged from the plates 152, 154, and the patched gasket 170 removed from the jig 140. The resulting gasket 170 is thereafter secured, for example, between two substantially rigid sheets, for storage, transportation, and handling.

It is thus seen that an improved large-diameter gasket for heat exchanger and the like is provided, together with an apparatus and method for manufacturing such large-diameter gaskets. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, many modifications, variations and changes may be made by those skilled in the art without departure from the spirit and scope of the invention as described by the following claims.

What is claimed is:

1. A large diameter gasket of a diameter exceeding twelve inches, comprising:
   an elongate, narrow metal band having a plurality of discrete sequential chords disposed at a small oblique angle relative to a longitudinal axis of the band formed by bending a sequentially extended portion of the band laterally across the width of the band to the oblique angle and having distal ends joined together to define a closed loop with a diameter exceeding twelve inches;
   a jacket of a sealing material defined by a plurality of discrete expanded intercalated graphite worms received around the band and compressed together enwrapping substantially the entire band but leaving a gap in the jacket in the portion of the loop where the distal ends join together; and
   a patch of additional expanded intercalated graphite worms received around the portion of the loop and compressed together as a sealing material enwrapping the portion of the band where the distal ends join together to define the closed loop.

2. The large diameter gasket as recited in claim 1, wherein the band defines a plurality of corrugations extending longitudinally.

3. A method of manufacturing a large diameter gasket of a diameter exceeding twelve inches, comprising the steps of:
   (a) moving an elongate band having a width greater than a thickness a predetermined distance to advance a portion of the elongate band into a bending press, said band having a jacket of a sealing material defined by a plurality of discrete expanded intercalated graphite worms received around the band and compressed together to enwrap the entire band;
   (b) holding the elongate band firmly in an adjacent holding press and in the bending press by pushing a pad in each of the holding press and the bending press against spaced-apart width portions of the elongate band;
   (c) pivoting the bending press adjacent the holding press from a first position laterally to a second position to bend the width portion of the band at an oblique angle in a plane of a longitudinal axis of the band, to thereby define a chord in the band;
   (d) releasing the elongate band from being held in the holding press and the bending press; and
   (e) repeating steps (a) through (d) until a loop of the elongated band is formed with a plurality of chords disposed at oblique angles relative to the adjacent chords,
   whereby the loop is separated from the band and opposing free ends of the loop are joined to form a closed loop, large diameter gasket.

4. The method as recited in claim 3, further comprising the step of forming longitudinally-oriented corrugations in the elongate band prior to step (a).

5. The method as recited in claim 3, further comprising the step of:
   (f) separating the elongate band from the loop defined by a plurality of chords formed by the bending press in sequential portions thereof to define two opposing distal ends; and
   (g) rigidly connecting the opposing distal ends of the loop together.

6. The method as recited in claim 3, further comprising the steps of:
   (f) separating the loop from the gasket band;
   (g) removing portions of the sealing material to expose opposing distal ends of the loop;
   (h) connecting the exposed opposing distal ends of the loop together; and
   (i) applying a patch of sealing material to the exposed connected portion of the loop.

7. An apparatus for manufacturing a large-diameter, comprising:
   a holding press and a bending press, disposed coaxially and spaced-apart for receiving an elongate gasket band therethrough, the gasket band having a width greater than a thickness, the holding press and the bending press selectively positionable in a first position for allowing the gasket band to move longitudinally on a width surface through the holding press and the bending press and a second position holding the gasket band rigidly from movement relative to the respective holding press and bending press;

a drive press disposed coaxially with and spaced-apart from the holding press and operative in opposite mode to the holding press and the bending press, whereby the gasket band is held tightly when the holding press and the bending press is in the first position, the drive press being movable longitudinally from a first position to a second position for moving a portion of the gasket band through the bending press;

the bending press pivotable from a first position to a second position at an oblique angle relative to a longitudinal axis of the gasket band, whereby the gasket band is bent along a line transverse to the longitudinal axis at an oblique angle relative to the longitudinal axis and in a plane with the unbent portion of the gasket band to define a chord therein; and pneumatic controllers for moving the respective holding, bending, and drive presses, whereby the holding press and the bending press operate in unison to move to the second position to hold the gasket band during a bending step when the bending press pivots from the first position to the second position, and the drive press operating in a holding mode for gripping the gasket band while the holding press and the bending press are in the first position in order for the drive press to move a portion of the gasket band longitudinally through the bending press, whereby the portion of the band is bent at the oblique angle to the longitudinal axis across the width surface in the plane defined by the band by the bending press pivoting to the second position.

8. An apparatus for applying a patch of a sealing material to an exposed portion of a metal gasket-material coated band gasket, comprising:

a U-shaped jig having two opposing sides which each define a plurality of opposing threaded bores;

a plurality of bolts, each of which is threadably engaged to a respective one of the bores and being movable to dispose a distal end of the bolt between a retracted position and an extended position;

a pair of spaced-apart plates disposed between the distal ends of the plurality of bolts;

a pair of resilient pads received between the plates for sandwiching an exposed portion of a metal gasket-material coated band gasket therebetween with a plurality of sealing material particles, whereby the plates, being forced against the opposing edges of the band by moving the bolts to the extended positions, hold the band while a plunger bears forcibly against the pads to press the gasket-material as a jacket around the band.

* * * * *

UNITED STATES PATENT AND TRADEMARK OFFICE
CERTIFICATE OF CORRECTION

PATENT NO. : 6,241,256 B1
DATED : June 5, 2001
INVENTOR(S) : Steven M. Suggs and Reid M. Meyer It is certified that error appears in the above-identified patent and that said Letters Patent is hereby corrected as shown below:

Claim 6,
Line 3, change "gasket" to --elongate --.

Signed and Sealed this

Twenty-seventh Day of November, 2001

Attest:

*Attesting Officer*

NICHOLAS P. GODICI
*Acting Director of the United States Patent and Trademark Office*